(12) United States Patent
Jackson

(10) Patent No.: US 6,908,554 B2
(45) Date of Patent: Jun. 21, 2005

(54) ORGANIC WASTE TREATMENT METHOD

(76) Inventor: Robert D. Jackson, R.R. 1 Box 59, La Plata, MO (US) 63549

( * ) Notice: Subject to any disclaimer, the term of this patent is extended or adjusted under 35 U.S.C. 154(b) by 116 days.

(21) Appl. No.: 10/411,696

(22) Filed: Apr. 11, 2003

(65) Prior Publication Data
US 2004/0031751 A1 Feb. 19, 2004

Related U.S. Application Data
(60) Provisional application No. 60/402,943, filed on Aug. 14, 2002.

(51) Int. Cl.[7] .................................................. C02F 3/00
(52) U.S. Cl. ........................ 210/601; 210/610; 210/622; 210/768; 210/770; 210/805; 210/801; 210/916
(58) Field of Search ................................. 210/601, 610, 210/622, 768, 770, 805, 801, 916

(56) References Cited

U.S. PATENT DOCUMENTS

| | | | |
|---|---|---|---|
| 3,701,727 A | 10/1972 | Kormanik | |
| 3,893,924 A | 7/1975 | La Compte Jr., et al. | |
| 3,973,043 A | 8/1976 | Lynn | |
| 4,906,369 A * | 3/1990 | Bahr | 210/297 |
| 5,282,879 A | 2/1994 | Baccarani | |
| 5,589,081 A | 12/1996 | Harris | |
| 5,627,069 A | 5/1997 | Powlen | |
| 5,707,856 A | 1/1998 | Higa | |
| 5,817,241 A * | 10/1998 | Brayboy | 210/800 |
| 6,004,461 A | 12/1999 | Harris | |
| 6,395,174 B1 | 5/2002 | Teran et al. | |
| 2002/0030012 A1 | 3/2002 | Sullivan et al. | |

* cited by examiner

Primary Examiner—Chester T. Barry
(74) Attorney, Agent, or Firm—Richard C. Litman

(57) ABSTRACT

The present invention is a method of recycling animal waste into a useable soil nutrient. The method involves separating the solid and liquid fraction of an animal waste slurry and separately treating both fractions with effective amounts of activated naturally occurring soil bacteria. The method also involves adding an odor eliminating microorganism to the animal waste to reduce or eliminate the foul odor of the waste material.

20 Claims, 3 Drawing Sheets

ORGANIC WASTE TREATMENT METHOD

CROSS-REFERENCE TO RELATED APPLICATION

This application claims the benefit of U.S. Provisional Patent Application Ser. No. 60/402,943, filed Aug. 14, 2002.

BACKGROUND OF THE INVENTION

1. Field of the Invention

The present invention relates generally to waste treatment, and in particular to a method of organic waste treatment.

2. Description of Related Art

The livestock industry has seen a gradual progression from a large number of smaller operations to a smaller number of larger operations, each confining large numbers of animals in a relatively small area. This trend has had a tendency to increase profits, as well as to increase the concentration of animal waste. Last year about sixty-four million tons of animal waste were generated in the United States from confined livestock.

Currently, the most common type of livestock feeding facility has a flooring grate or pit which allows animal manure to fall away from the animals themselves into a holding area. Water is then used to periodically flush the manure from the holding area, thereby forming a waste slurry. The slurry is then piped into a holding lagoon where much of the solid waste precipitates into a sludge at the bottom of the lagoon or pit.

Unfortunately, there are several drawbacks to the aforementioned method. While there is bacteria present in the lagoons capable of digesting the accumulating sludge, this anaerobic digestion is a slow process and is ordinarily not efficient enough to prevent the buildup of sludge on the bottom of the lagoon or pit. Lagoons often fill to capacity in short order, which tends to limit their effectiveness as holding areas.

Many of the bacteria present in lagoons tend to produce noxious odors as they break down the sludge. These odors are especially troublesome and may be considered a nuisance when the lagoons are located near populated areas. Many states require large buffer zones around waste lagoons.

When lagoons or pits fill, the sludge is spread over surrounding fields as fertilizer. Due to the anaerobic bacteria's inability to completely digest the sludge, unacceptably high levels of phosphorous, nitrogen and other nutrients are often present. These nutrients build up into high residual concentrations in the soil and can leach directly into groundwater or run-off into surface waters. Nutrient pollution has been inked to low oxygen concentrations in surface waters and fish kills from the nutrient induced hyper-reproduction of dinoflagellates.

The related art shows several attempts to address the problems inherent with the abovementioned method of manure disposal. For example:

U.S. Pat. Publication No. 2002/0030012, published Mar. 14, 2002, discloses a process to create a treated recycle stream through pre-treatment and solids separation for reuse in animal feeding operations. The method disclosed in the publication differs from the present invention in that the present invention is much simpler in design and results in an end product consisting of a soil nutrient rather, than a protein supplement.

U.S. Pat. No. 3,701,727, issued to Kormanik, and U.S. Pat. No. 3,893,924, issued to Le Compte, Jr. et al., disclose different methods of aerating waste lagoons to encourage aerobic consumption of organic waste. Neither of these methods involves the separation of the liquid and solid components of organic waste, as does the present invention.

U.S. Pat. No. 3,973,043, issued to Lynn, discloses a method of transforming feedlot animal wastes into useful materials. The process involves using anaerobic fermentation of a waste slurry to produce and capture methane with a following aerobic fermentation step to further reduce the waste slurry into animal feed. This method differs from the present invention in, among other ways, that it does not produce soil nutrients as an end product.

U.S. Pat. No. 5,282,879, issued to Baccarani, discloses a continuous process for the preparation of fertilizers from animal waste. This method differs from the present invention in that it uses non-naturally occurring chemicals, such as nitric acid and calcium hydroxide, to break down the animal waste.

U.S. Pat. No. 5,627,069, issued to Powlen, discloses methods and compositions for treating on-site animal waste pits in order to soften the fluidized hardened solid wastes found therein. The methods and compositions involve the use of Lactobacillus bacteria and nitrogen fixing bacteria. The '069 patent differs from the present invention in that the '069 invention is intended to break up encrusted solids on the bottom of a waste lagoon rather than to breakdown separated solids into soil nutrients.

U.S. Pat. No. 6,395,174, issued to Teran et al., discloses an apparatus and method for treating waste lagoons. The method involves aeration of the lagoon and the insertion of bacteria specialized to digest the particular type of waste present therein. The '174 patent differs from the present invention in that it does not show a step of injecting bacteria into dewatered waste solids.

None of the above inventions and patents, taken either singly or in combination, is seen to describe the instant invention as claimed.

SUMMARY OF THE INVENTION

The present invention is a method for treating organic waste which transforms the solid portion of the waste into a non-polluting, organic, soil enhancement. The invention is used in conjunction with a traditional feedlot animal waste containment system having animal pens and a waste lagoon. The invention uses traditional methods to wash animal waste from the animal pens and thereby create a waste slurry. At that point, the waste slurry is directed to a divided phase separator, also known as a dewatering box.

In the dewatering box the solid component of the waste slurry is separated from the liquid component and the solid component is retained. Meanwhile, the liquid component is permitted to flow to a waste lagoon. Once the dewatering box has filled with solid organic waste it is disconnected from the slurry pipe and taken to a second location and deposited to form a pile of solid organic waste.

The organic waste pile is then injected with an active culture containing a plurality of different naturally occurring soil bacteria. The bacteria are selected for their nonpathogenic and symbiotic qualities, as well as their ability to digest particular types of organic waste. The bacteria digest the organic waste pile and reduce it over time into a non-polluting soil nutrient. This product is similar to potting soil and may be sold as a soil enhancer.

An optional step of the invention comprises the injection of an active microbial culture into the aforementioned liquid wastes stored in the lagoon. These bacteria would function to purify the lagoon water to the point where its waters could be recycled into forming the majority component of the waste slurry.

An additional step of the invention comprises the introduction of microorganisms into the environment of the livestock and poultry production units. The microorganisms are added to abate the odor of the organic waste. The odor eliminating microorganisms may be introduced by several different techniques. The microorganisms may be introduced during the wash down of the facilities. Alternatively, the microorganism may be introduced during the treatment of the solid waste piles and the liquid waste stored in the lagoon. Finally, the microorganisms may be introduced directly to the intestinal track of the animals through their feed or through water. The frequency and intensity of each introduction may vary, depending upon the original micro floral environment of the operation. The reduction or elimination of odor may be accomplished by the use of one or a combination of introduction techniques.

Accordingly, it is a principal object of the invention to provide a method of recycling animal wastes.

It is another object of the invention to provide a method of recycling animal wastes that is free of noxious odors.

It is a further object of the invention to provide a method of recycling animal waste that produces a commercially valuable product in a reduced amount of time.

Still another object of the invention is to provide a method of recycling animal wastes that uses no chemicals.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
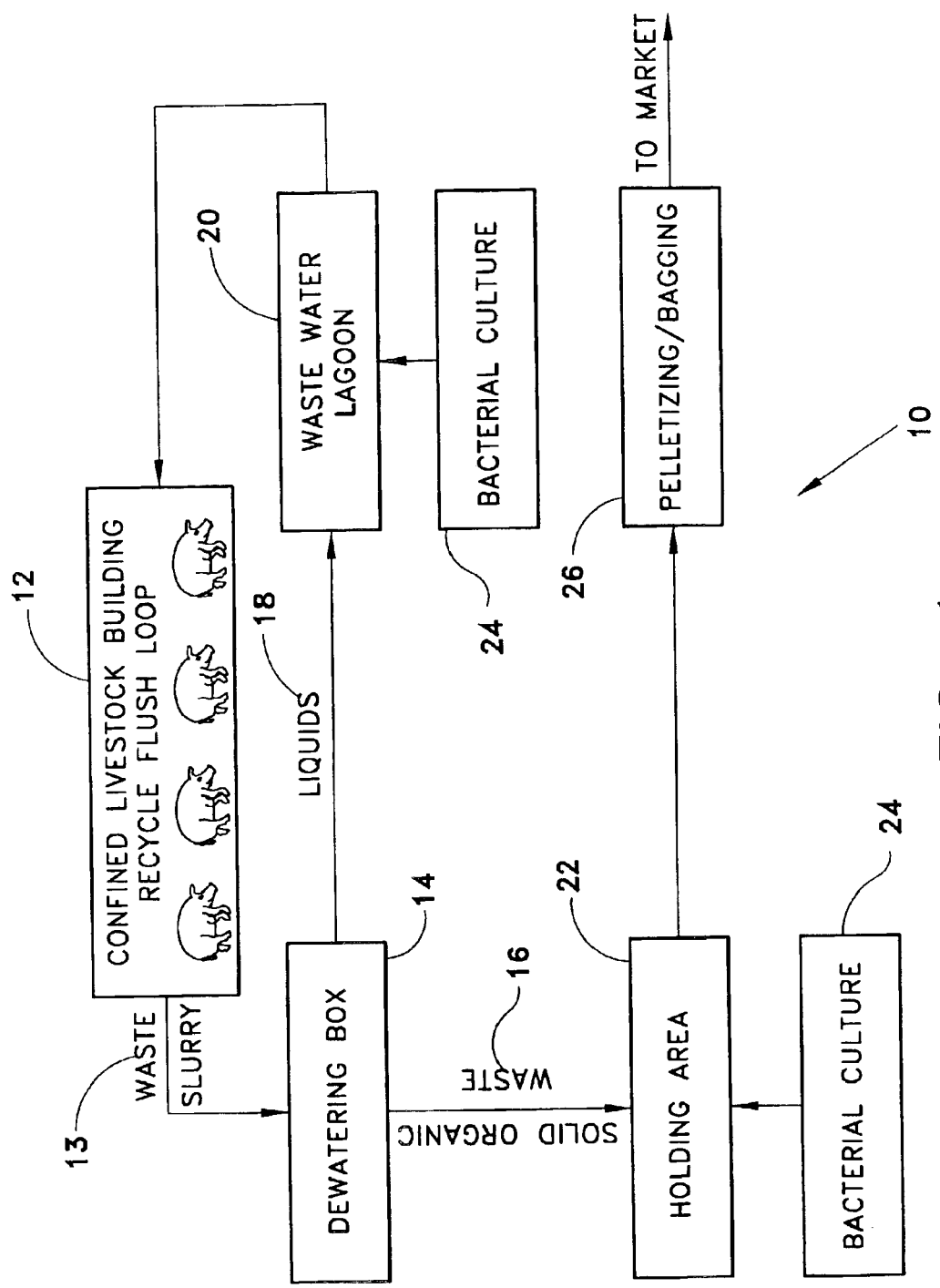
FIG. 1 is a block diagram of an organic waste treatment method according to the present invention.

The steps of the present invention, an organic waste treatment method 10, are described with reference to the components shown in the block diagram of FIG. 1. Block 12 represents an animal feeding facility such as a confined livestock building. Ordinarily, this type of building contains a number of animal pens, feeding apparatus, grated floors and pits. The animal waste precipitates through the grated floor into a collection area. Water is periodically used to flush the collection area free of animal waste thereby forming an animal waste slurry 13. The slurry is channeled into a pipe.

Block 14 is a divided phase separator or dewatering box which functions to separate the solid organic waste 16 (solid portion of the waste slurry) from the liquids 18 in the slurry 13 and store the solid waste 16. U.S. Pat. Nos. 5,589,081 and 6,004,461, both issued to Harris, disclose divided phase separators. The disclosure of the '081 and '461 patents to Harris are herein incorporated by reference. It must be noted that the present invention is not limited to the above-mentioned phase separators, but includes any equivalent device which performs the same function.

The liquids 18 are channeled to a wastewater lagoon represented by box 20. The size and capacity of the lagoon is determined by the number and type of animals present in the livestock feeding facility 12. For example, cows produce a far greater volume of waste per pound than pigs, and would therefore require a larger lagoon. The wastewater lagoon 20 may be optionally treated as detailed below.

The solid organic waste 16 is collected in the dewatering box 14 until the box is filled to capacity. Once filled, the box 14 is moved to a different location. The most preferable dewatering box 14 is constructed upon, or incorporated with, a trailer assembly, such that the entire assembly can be connected to a tractor and moved to a location suitable for the next step in the process. It is well within the ability of one skilled in the art to construct such an assembly.

Block 22 represents a holding area. Typically this is a flat or slightly concave area exposed to the elements and preferably having a low soil permeability. The solid organic waste is piled in such an area for treatment as detailed below. The holding area 22 may also be an enclosed area sheltered from the elements, which may be advantageous for biodegradation in colder climates.

Once deposited in the holding area 22, the solid organic waste 16 is treated with an activated microbial suspension. A preferred microbial suspension is known as EM-1™ and is produced by EM Technologies, Inc. of Tucson, Ariz. The exact type and number of different bacteria may be varied according to the type of animal waste to be treated. One way of determining the microbial composition and preparing the microbial suspension can be found in U.S. Pat. No. 5,707,856 to Higa, the disclosure of which is herein incorporated by reference.

The preferred method of preparation of the EM-1 microbes is to combine one part of the microbial inoculant with one part sugar, such as molasses, and 20 parts water. Once the mixture reaches a pH of less than 4.0, the mixture is further diluted with up to 5000 parts water, thereby creating a microbial culture as represented by box 24 on FIG. 1.

Figure 2:
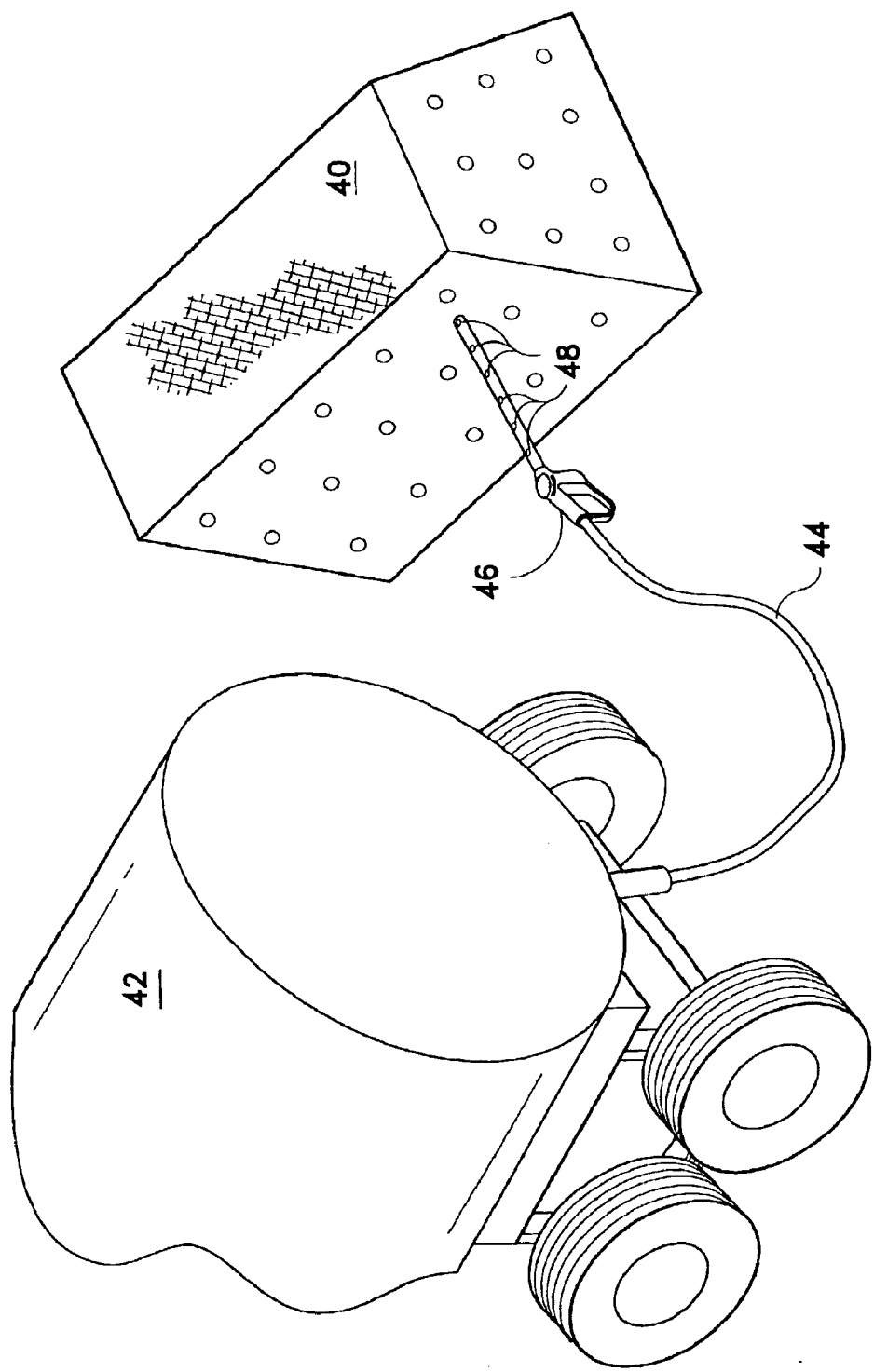
FIG. 2 is a environmental, perspective view of a pile of solid organic waste being injected with a microbial suspension.

The application of microbial culture 24 to the solid organic waste pile 40 is detailed in FIG. 2. Ordinarily, a liquid pump 42 having a hose 44, and a nozzle 46 with a handgrip may be used to apply the microbial culture 24 to the pile of solid organic waste 40. The nozzle has a number of perforations 48 defined therein and a pointed end. When in use the nozzle is forced into the solid organic waste pile 40 at regular intervals and the handle is used to release an effective amount of microbial culture 24. The microbial culture 24 may also be sprayed onto the organic waste piles 40. If the microbial culture 24 is applied by spray, the organic waste pile 40 must be disturbed to allow the microbial culture 24 to treat all of the contents of the organic waste pile 40.

After the application of the microbial suspension 24, the solid organic waste piles 40 are left undisturbed for a period of time long enough to allow the bacteria to digest the solid organic waste pile 40. One skilled in the art determines this time period by examining the tilt and appearance of the solid organic waste pile 40. Generally, when the waste piles 40 resemble potting soil, the process is complete.

Figure 3:
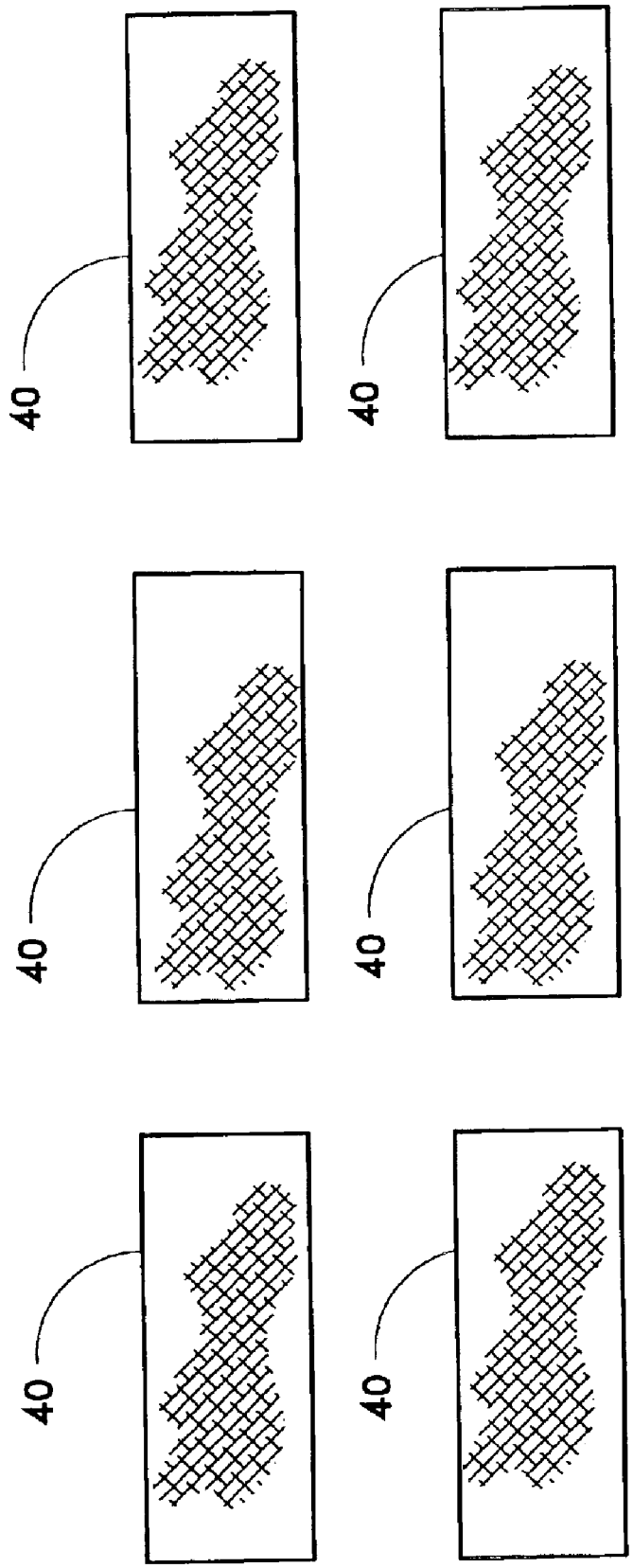
FIG. 3 is a schematic view of several organic waste piles in a preferred arrangement.

Once the solid organic waste piles 40 are sufficiently treated, they become piles of non-polluting soil nutrients, as depicted in FIG. 3. The piles of nutrients are preferably orientated linearly so that the piles of nutrients may be more easily accessed by a bagging or pelletizing machine as illustrated in FIG. 1 at block 26.

The microbial culture 24 may also be applied to the wastewater lagoon 20. Ordinarily, a comparatively large amount of the culture 24 would be applied to allow the chosen bacteria to take over the lagoon. Once this culture has been established the culture must be maintained with periodic reapplication of the microbial culture 24 to maintain the necessary microbial balance.

Microorganisms may optionally be introduced into the environment of the livestock and poultry production units. The microorganisms are introduced to organically reduce or eliminate the foul odor of the organic waste piles 16 and the liquid waste 18. The microorganisms may be introduced by several different techniques at different stages of the waste treatment method 10. The odor eliminating microorganisms may be introduced during the washdown of the animal feeding facility 12. Thus, the microorganisms would be introduced with the water that is used to periodically flush the collection area free of animal waste.

The odor eliminating microorganisms may also be introduced during the treatment of the solid waste 16. The microorganisms may be injected into the solid waste 16 by the liquid pump 42 as shown in FIG. 2. The microorganisms may also be sprayed onto the solid waste 16. If sprayed on, the organic waste pile 40 must be disturbed. Additionally, the microorganisms may be introduced to into the liquid waste 18 in the wastewater lagoon 20.

The odor eliminating microorganisms may also be introduced directly to the animals before they create their waste. The microorganisms may be introduced to the animals' intestinal tracks with water. The microorganisms may also be direct fed to the animals. To direct feed the microorganisms, the animals are fed a feed with a low percentage of fermented feed as part of the total ration to introduce microorganisms into the animals' intestinal tracks.

The frequency of application and intensity of each application of the microorganisms may vary depending upon the original micro floral environment of the operation. The reduction or elimination of the foul odors may be accomplished by the use of one or a combination of the methods of introduction discussed.

It is to be understood that the present invention is not limited to the sole embodiment described above, but encompasses any and all embodiments within the scope of the following claims.

I claim:

1. A method of organic waste treatment comprising the steps of:
   (a) using water to collect solid and liquid animal waste;
   (b) separating the solid waste from the water and liquid waste by channeling a slurry formed by the water, solid animal waste, and liquid animal waste in step (a) through a pipe into a divided phase separator, and processing the slurry in the divided phase separator;
   (c) treating the solid waste with an activated microbial suspension; and
   (d) using the treated solid waste as a soil enhancement.

2. The method of organic waste treatment according to claim 1, wherein said processing step further comprises collecting the solid waste in said divided phase separator until said divided phase separator is filled to capacity.

3. The method of organic waste treatment according to claim 2, further comprising the step of transferring the solid waste from said divided phase separator to a holding area for further treatment after said divided phase separator is filled to capacity.

4. The method of organic waste treatment according to claim 1, further comprising the step of channeling the liquid waste to a wastewater lagoon.

5. A method of organic waste treatment comprising the steps of:
   (a) using water to collect solid and liquid animal waste;
   (b) separating the solid waste from the water and liquid waste;
   (c) treating the solid waste with an activated microbial suspension by preparing a culture comprising:
      one part of the activated microbial suspension;
      one part of sugar; and
      20 parts water to achieve a mixture with a pH of less than 4, and further diluting the mixture with up to 5000 parts water; and
   distributing the culture throughout the solid waste; and
   (d) using the treated solid waste as a soil enhancement.

6. The method of organic waste treatment according to claim 5, wherein said distributing step further comprises:
   spraying a pile of the solid waste with the culture; and
   disturbing the pile to distribute the culture through the pile.

7. The method of organic waste treatment according to claim 5, wherein said distributing step further comprising injecting the culture into a pile of the solid waste at a plurality of locations.

8. The method of organic waste treatment according to claim 1, further including the step of treating said liquid waste in said waste water lagoon with said activated microbial suspension.

9. The method of organic waste treatment according to claim 1, further including the step of treating said solid waste and said liquid waste with an odor abatement microorganism.

10. The method of organic waste treatment according to claim 1, further comprising the step of spraying an odor abatement microorganism onto the solid waste and the liquid waste.

11. The method of organic waste treatment according to claim 1, further comprising the step of injecting an odor abatement microorganism into the solid waste and the liquid waste.

12. The method of organic waste treatment according to claim 1, further comprising the step of introducing an odor abatement microorganism into the animal feed of animals producing the solid waste and the liquid waste.

13. A method of organic waste treatment and odor abatement comprising the steps of:
   (a) mixing water with solid animal waste and liquid animal waste;
   (b) forming the water, solid animal waste and liquid animal waste into a slurry;
   (c) channeling the slurry through a pipe into a divided phase separator;
   (d) separating the solid waste from the liquid waste in said divided phase separator;
   (e) collecting the solid waste in said divided phase separator until said divided phase separator is filled to capacity;
   (f) transferring the solid waste from said divided phase separator to a holding area for further treatment;

(g) channeling the liquid waste to a wastewater lagoon;

(h) treating the solid waste with an activated microbial suspension;

(i) treating the liquid waste in said wastewater lagoon with said activated microbial suspension (j) treating the solid waste and the liquid waste with an odor abatement microorganism; and (k) using the treated solid waste as a soil enhancement.

14. The method of organic waste treatment and odor abatement according to claim 13, wherein steps (h) and (i) further comprise the steps of:

preparing a culture comprising:
one part of the activated microbial suspension;
one part of sugar; and
20 parts water to achieve a mixture with a pH of 3.4, and further diluting the mixture with up to 5000 parts water; and distributing the culture throughout the solid waste.

15. The method of organic waste treatment and odor abatement according to claim 14, wherein said distributing step further comprises:

spraying a pile of the solid waste with the culture; and disturbing the pile to distribute the culture through the pile.

16. The method of organic waste treatment and odor abatement according to claim 14, wherein said distributing step further comprising injecting the culture into a pile of the solid waste at a plurality of locations.

17. The method of organic waste treatment and odor abatement according to claim 13, wherein step (j) further comprises the step of spraying the odor abatement microorganism onto the solid waste and the liquid waste.

18. The method of organic waste treatment and odor abatement according to claim 13, wherein step (j) further comprises the step of injecting the odor abatement microorganism into the solid waste and the liquid waste.

19. The method of organic waste treatment and odor abatement according to claim 13, further comprising the step of introducing the odor abatement microorganism into the animal feed of animals producing the solid waste and the liquid waste.

20. A method of organic waste treatment comprising the steps of:

(a) using water to collect solid and liquid animal waste;

(b) separating the solid waste from the water and liquid waste;

(c) treating the solid waste with an activated microbial suspension; and (d) using the treated solid waste as a soil enhancement;

(e) introducing an odor abatement microorganism by either putting it into the feed of animals producing the solid waste and the liquid waste, or by spraying it onto the solid waste and the liquid waste.

* * * * *